Feb. 5, 1952  R. TOUSEY  2,584,171
GUN SIGHT HAVING A PLURALITY OF ILLUMINATED RETICLES
Filed Feb. 25, 1943  2 SHEETS—SHEET 1
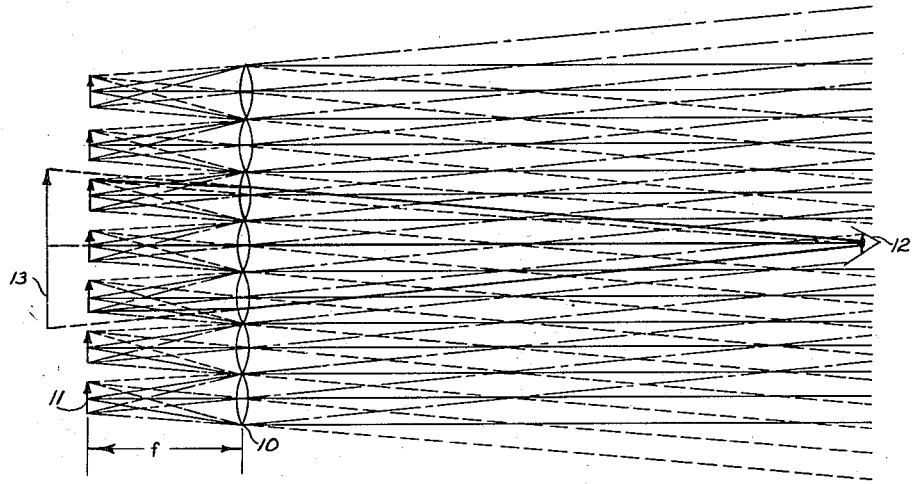
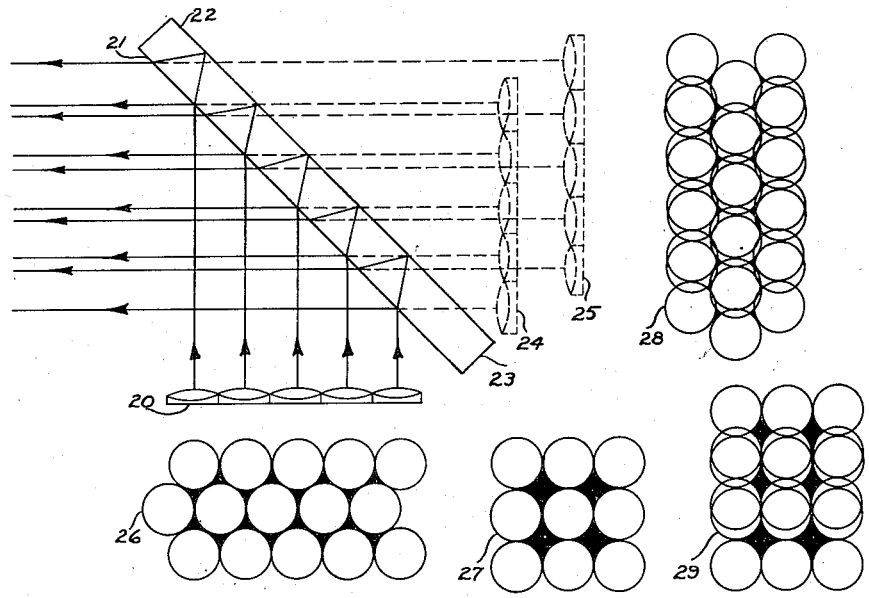
Inventor
RICHARD TOUSEY
By
Attorney Feb. 5, 1952  R. TOUSEY  2,584,171
GUN SIGHT HAVING A PLURALITY OF ILLUMINATED RETICLES
Filed Feb. 25, 1943  2 SHEETS—SHEET 2
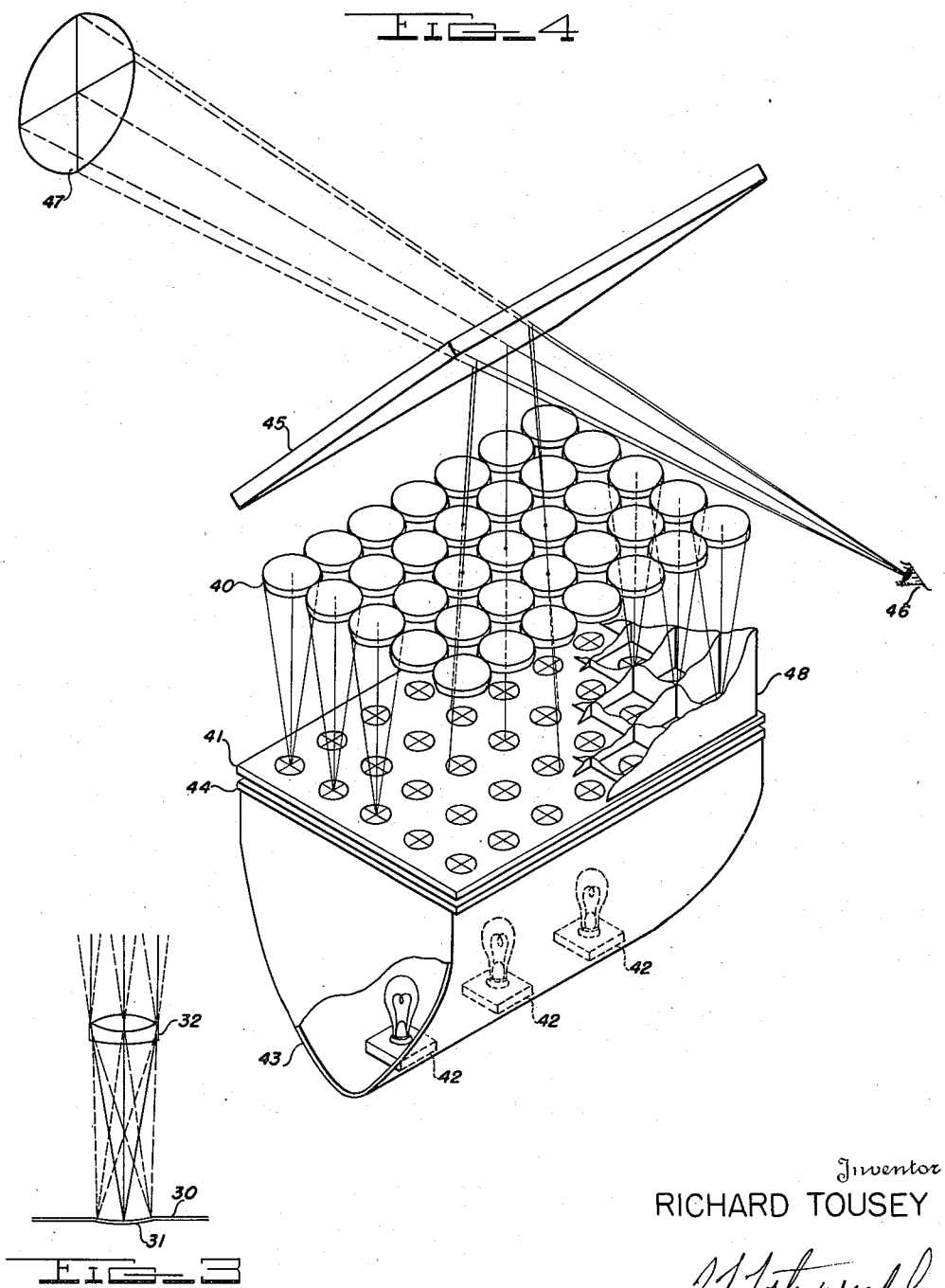
Inventor
RICHARD TOUSEY Patented Feb. 5, 1952

2,584,171

UNITED STATES PATENT OFFICE 2,584,171

GUN SIGHT HAVING A PLURALITY OF ILLUMINATED RETICLES

Richard Tousey, Forest Heights, Md.

Application February 25, 1943, Serial No. 477,030

3 Claims. (Cl. 88—2.3)

(Granted under the act of March 3, 1883, as amended April 30, 1928; 370 O. G. 757)

This invention relates to an optical device capable of projecting a virtual image at an infinite distance, and it is particularly concerned with a new type of alignment device or gun sight which permits greater freedom of movement of the observer than conventional types.

For certain types of guns the old style sights placed in the path of vision have long since been discarded in favor of optical systems which project a luminous reticle on the target in the form of a virtual image. An inherent advantage of such a system is its freedom from visual obstruction, that is, the gunner has a clear field of view at all times. By design of very large lenses and complicated lens systems it has been possible to project the virtual image of the reticle in such a manner that the gunner need not keep his eye in one exact position, but he may move his head, perhaps two or three inches, away from dead center and still see the image of the reticle superimposed on his target. However, the best of these sights heretofore designed requires complex lens systems of wide aperture, with consequent costliness of production, and even then does not permit the gunner to move his head very far from center without losing the image of the reticle. This restriction is often very annoying to gunners, particularly where they are located on fast moving craft, because they either must concentrate in maintaining a certain relative body position or lose the gun sight, either of which often results in poor aim.

This invention provides an optical device which is capable of projecting a virtual image at an infinite distance in such a manner that it may be seen by the observer, not only from a centered position, but from any position to one side or another (which includes backward or forward) from the center, with as far a displacement as is desired. The appartus is particularly adapted as a gun sight inasmuch as changes in the gunner's position do not introduce parallax, or throw the image of the reticle off of the target, and a particularly valuable feature resulting from this fact is that the gunner may employ both eyes in normal manner in training the gun. Other advantages include its small height, fewer lens surfaces per reticle and consequent more brilliant, trouble-free image. The apparatus of this invention may be employed for many kinds of alignment problems, of which training a gun is only one.

By the term "infinite distance" it is meant that rays of light emanating from a single point of the picture or real image being projected emerge from the apparatus in substantially parallel rays and are received as such by the eyes of the observer.

Briefly, the invention comprises a system of identical, aligned pictures (by which is meant any kind of two-dimensional representation, including real images formed by lenses) and an array of convex lenses all of substantially the same focal length and lying in the same plane. Each lens is axially aligned with one picture and the system of pictures is positioned so that each individual picture lies at the focal distance from its lens. The pictures may be illuminated in any conventional way so that they may be visible through the lens array, and where the device is to be used as a gun sight, one or more partially reflecting surfaces are employed to project the virtual image of the picture at a substantially infinite distance against the background or target observed by vision through the partially reflecting surface.

In order that the invention may be clearly understood its theory of operation and construction are described in detail with reference to the accompanying drawing, in which:

Fig. 1 is a schematic diagram illustrating the optics of the lens array;

Fig. 2 is a schematic diagram illustrating the optics of multiple partially reflecting surfaces and the effect of lens placement on image illumination;

Fig. 3 is a diagram illustrating the placement of a picture or reticle in the focal surface of a lens, and Fig. 4 is a drawing in perspective of a complete gun sight made in accordance with the invention.

Referring to Fig. 1, a simple lens array 10 is shown in section and parallel to a system of pictures or images 11 (shown as small arrows). The individual lenses in the array 10 all have the same focal length. Each picture or arrow in the system 11 is axially in alignment with an individual lens and is spaced a distance equal to the focal length (f) away from the lens. Also all arrows are orientated in the same direction. According to the optics of convex lenses it is seen that, with the arrangement described, all rays of light coming from corresponding points of all pictures and passing through the lenses will leave the lens array parallel to one another. This is shown schematically for points at the ends and center of each arrow, solid lines representing rays from the center points, dotted lines representing rays from the heads of the arrows and dot-dash lines indicating rays from the tails of the arrows. If any of these parallel rays now enter an observer's eye, say at a position 12, the observer will view parts of several arrows so aligned that a single virtual image 13 appears, and the image 13 always remains directly in front of the observer no matter where the observer may move from the position 12, until he has moved so far that the parallel rays no longer enter his eye. Since the rays from corresponding points on the arrows are parallel the image 13 will appear to be at an infinite distance from the observer, that is, superimposed on a distant object, and because the image 13 does not shift across the distant object as the observer moves, the observer (e. g. a gunner) is free to move any distance within the limits of the lens array without encountering parallax or losing his "bead" on the distant object.

From theoretical considerations it is obvious that the image 13 does move across the distant object with respect to the lens array, and this displacement is actually equal to the movement of the observer. However, for observer's movements of a foot or so the angular shift of the image 13 is negligible when superimposed on objects at an appreciable distance, and for gunnery from moving vehicles an error of a foot at a distance, say, of a thousand yards is less than the unavoidable errors in aim.

Where circular lenses are used to build up an array there are unavoidable spaces or voids between the lenses, which preferably should be rendered opaque to avoid stray light from interfering with observation of the image. These voids will not in any way disturb the single virtual image seen by the observer, unless they are at least as large as the lenses themselves in aperture, and this will not be encountered if the lenses are placed adjacent each other. The voids will, however, have some effect on the brightness of the virtual image, but their effect can be minimized or even eliminated from the practical standpoint by observing the image by means of a plurality of parallel partially reflecting surfaces, as is shown in Fig. 2. The voids can be eliminated by cutting the lenses in a square or hexagonal shape.

In Fig. 2 a lens array 20 is shown in simplified form below a pair of reflecting surfaces 21 and 22 which may be the surfaces of a sheet of glass 23. Arrows indicate the paths of center rays, part of which are reflected from the surface 21 and part from the surface 22. To an observer the lens array appears overlapped, as shown by images 24 and 25. If the lens array 20 is in the closest spaced form (i. e., triangular or hexagonal pattern) the overlapping caused by the reflection from the surfaces 21 and 22 practically eliminates noticeable variation in virtual image brightness, whereas a "square" array requires more reflecting surfaces (e. g. two parallel sheets of glass, giving four reflecting surfaces) to reduce the effects of the voids to the same extent. The effect of the two reflecting surfaces 21 and 22 on hexagonal and square arrays 26 and 27 is shown in corresponding double images 28 and 29, respectively, the voids in each case being filled in for easy identification. It is obvious that the amount of overlap of the reflections depends on the spacing between the parallel reflecting surfaces, and an optimum spacing (or thickness of the reflecting glass) is easily found for a given lens array and angle of reflection.

For extreme accuracy, such as is required of certain types of gun sights, it is generally more convenient and economical to design the reticles so that they will lie in curved focal surfaces of the lens array, rather than to design a complex lens system whose focal surfaces approach a plane, since the reticle may be ruled or photographed on a plastic film especially shaped to lie in the focal surfaces of the lens array. Such an arrangement is illustrated for a single lens and reticle in Fig. 3, in which a transparent support 30 has a curved depressed portion 31 on which the reticle (or other picture) is printed, engraved, or otherwise placed. The portion 31 lies at the focal surface of a lens 32. If desired, the entire system of reticles may be stamped from a metal sheet, with the reticles cut through the depressed parts which fit in the focal surfaces of the lenses.

In Fig. 4, a complete gun sight is shown in perspective, certain obvious supports having been omitted and other parts broken away for the sake of clearness. A lens array 40 is shown in a square pattern although the hexagonal array 26 of Fig. 2 could equally well be used. The individual lenses of the array 40 are shown without support to simplify the drawing, but they may be mounted, for example, by cementing them to a plane sheet of glass (the cement or pitch being placed in the voids between adjacent lenses), or the entire array may be molded from a sheet of clear plastic, the lenses then being integral with the sheet.

Below the array 40 is a system of reticles 41 positioned with respect to the lenses as described with reference to Fig. 1 or Fig. 3. The system 41 may be a photographic reproduction or an engraving or any other preparation which is translucent or transparent and will permit illumination of the reticles by transmitted light. Any translucent support, such as glass or various plastics may be used, and a sheet of molded plastic, or stamped metal with the reticles cut through, is preferred where the reticles are to be curved as described with reference to Fig. 3. Below the system 41 is a source of illumination comprising lamps 42, a reflector 43 and a diffuser 44, of conventional design to furnish substantially uniform illumination of the system of reticles 41.

Above the lens array 40 is a plate 45 of glass or clear plastic having plane-parallel surfaces and rigidly mounted with respect to the array 40 and system 41. When this device is placed so that the field of view or target is observed through the plate 45, say from the position 46, a luminous reticle image 47 appears superimposed on the distant target. Lines drawn from the position 46 to the plate 45 and thence through five adjacent lenses to corresponding reticles indicate the formation of the image (see also Fig. 1).

Due to the closeness of the reticles it is often possible to see them through lenses other than the axially aligned ones, and this causes the appearance of spurious images displaced laterally from the true one. The spurious images are easily obviated by enclosing the space between the lens array 40 and the system of reticles 41 with a set of shields or partitions arranged in a "honeycomb" so that only rays from the proper reticle can pass through each lens. Such a honeycomb shield is shown as a shield 48, partly broken away to simplify the drawing.

In the lens array 40 the individual lenses may be of the simplest type, but for the most accurate gun sight the lenses should be of the achromatic type and also corrected for spherical aberration. A satisfactory compound lens of this type has been found to be the typical objective lens of any good grade of field glasses, these being generally two or three component cemented systems. Compound lenses also may be molded from two or more plastic sheets of different densities, and the sheets cemented together to form the complete array.

For use, the gun sight is rigidly mounted on the gun carriage (or other support whose position follows that of the gun) and the partly reflecting plate 45 (or the whole instrument) is adjusted until the reticle image appears exactly on the target, for whatever range is desired. Then the plate 45 (or entire instrument) is rigidly clamped in place.

The means selected for illuminating the reticle system will depend on what is the most convenient under the circumstances. A simple means is shown in Fig. 4, but any other means of obtaining fairly uniform illumination may be used, such as a single lamp and full parabolic reflector, individual lamps for each of the reticles, or the sky itself may be employed. In the latter case the gun sight is mounted in an inverted position without the lamps 42, the reflector 43 and the diffuser 44 so that sky light or sunlight may fall directly on the reticle system. Alternatively, mirrors may be used to direct the light against the reticle system, and a fairly constant degree of contrast between image and target may be obtained by reflecting light from the target area itself onto the reticle system. In such an arrangement (as well as others) it is desirable to increase the reflectivity of the surface 45 so that the image can be seen with a minimum of reticle illumination. The surface 45 may be partially silvered, but a more efficient combination of reflection and transmission is obtained by depositing a highly reflecting film on the surface 45, such as titanium dioxide or zinc sulfide (or other high density, transparent substance).

If the gun sight is to be used in aircraft of the fighter type, where the guns are fixed in the direction of flight, the pilot's windshield itself may serve the function of the partially reflecting surface 45. However, the device is not as flexible in operation if the windshield is used to direct the virtual reticle image because against a brilliant background, such as sunlit clouds, it may be so difficult to distinguish the reticle image that it is necessary to reduce the background brilliancy by means of tinted glass or other optical filters, and it is seldom desirable to tint the windshield permanently. On the other hand a separate reflecting surface 45 may be tinted to reduce background glare without dimming the reticle image and can be substituted by clear material (or a filter removed) whenever the background illumination is low.

Many variations will be apparent to those skilled in the art, and the invention should not be limited other than as defined by the appended claims.

The invention described herein may be manufactured and used by or for the Government of the United States of America for governmental purposes without the payment of any royalties thereon or therefor.

I claim:

1. An optical alignment apparatus comprising a source of illumination, a plurality of substantially identical reticle-lens pairs in which the reticle is positioned axially with respect to its associated lens, and a plane transparent reflector arranged at an angle to the axis of the reticle-lens system, all of said lenses being arranged to lie in the same plane and all of said reticles being arranged to lie in a plane parallel to said lens plane, the elements of the system combining light from an object viewed through the reflector with light from the reticles to give a virtual image of a single reticle superimposed on the object viewed.

2. A gun sight comprising a plane transparent reflector placed to be used as a viewer, a plurality of substantially identical small lenses arranged in a plane which determines an angle with the viewer, a plurality of small reticles corresponding in size to said lenses to form a plurality of substantially identical reticle-lens pairs, arranged in a plane parallel to said lens plane each reticle being centered with respect to the axis of a corresponding lens, shields separating the lens-reticle pairs from each other, and an illumination system beneath said reticle plane, said reticles, lenses, and viewer cooperating to combine light from an object viewed with light from said illumination system to give a virtual image of a single reticle superimposed thereon when viewed through any portion of the viewer.

3. A gun sight comprising a plane transparent reflector placed at an angle to the line of sight, a plurality of small convex lenses having the same focal length and the same diameter arranged to lie in a plane parallel to the line of sight, a plurality of small reticles corresponding in size to the said lenses arranged to lie in the focal plane of said lenses each reticle center being aligned with the center of a corresponding lens, said arrangement of reticles, lenses and reflector cooperating to combine light from an object viewed through said reflector with light from said reticles to give a virtual image of a single reticle superimposed on said object.

RICHARD TOUSEY.

REFERENCES CITED

The following references are of record in the file of this patent:

UNITED STATES PATENTS

| Number | Name | Date |
|---|---|---|
| Re. 19,070 | Chretien | Feb. 6, 1934 |
| 533,324 | Stevens | Jan. 29, 1895 |
| 683,203 | Grubb | Sept. 24, 1901 |
| 922,938 | Mustin | May 25, 1909 |
| 1,610,532 | Russell et al. | Dec. 14, 1926 |
| 2,071,676 | Williams | Feb. 23, 1937 |
| 2,190,569 | Macgill | Feb. 13, 1940 |
| 2,198,714 | Williams | Apr. 30, 1940 |
| 2,251,984 | Cleaver et al. | Aug. 12, 1941 |
| 2,281,474 | Cartwright et al. | Apr. 28, 1942 |
| 2,313,204 | Morelle | Mar. 9, 1943 |

FOREIGN PATENTS

| Number | Country | Date |
|---|---|---|
| 21,456 | Great Britain | Sept. 20, 1909 |
| 15,708 | Great Britain | Nov. 6, 1915 |
| 437,444 | Great Britain | Oct. 28, 1935 |
| 147,613 | Austria | Nov. 10, 1936 |
| 828,107 | France | Feb. 7, 1938 |

OTHER REFERENCES

Pfund in J. O. S. A., vol. 24, April 1934, pages 99, 100. Photostatic copy in 88/1.

Cartwright et al. in Bulletin Am. Phy. Soc., vol. 14 #2 April 1939, page 24, article 92. (Photostatic copy in 88-1.)